United States Patent
Sandberg et al.

(10) Patent No.: US 12,244,531 B2
(45) Date of Patent: Mar. 4, 2025

(54) SYSTEMS AND METHODS FOR USING ORTHOGONAL DEMODULATION REFERENCE SIGNAL PORTS WITH RESOURCE BLOCK REUSE IN A SINGLE CELL

(71) Applicant: CommScope Technologies LLC, Hickory, NC (US)

(72) Inventors: Stuart D. Sandberg, Acton, MA (US); Irfaan Ahamed Salahuddeen, Acton, MA (US); Ehsan Daeipour, Southborough, MA (US)

(73) Assignee: CommScope Technologies LLC, Claremont, NC (US)

( * ) Notice: Subject to any disclaimer, the term of this patent is extended or adjusted under 35 U.S.C. 154(b) by 329 days.

(21) Appl. No.: 17/938,748

(22) Filed: Oct. 7, 2022

(65) Prior Publication Data

US 2023/0115253 A1     Apr. 13, 2023

Related U.S. Application Data

(60) Provisional application No. 63/262,202, filed on Oct. 7, 2021.

(51) Int. Cl.
*H04W 16/02*     (2009.01)
*H04L 5/00*      (2006.01)
*H04L 25/02*     (2006.01)

(52) U.S. Cl.
CPC ........ *H04L 5/0051* (2013.01); *H04L 25/0224* (2013.01); *H04W 16/02* (2013.01)

(58) Field of Classification Search
CPC . H04W 16/02; H04W 72/23; H04W 72/1263; H04W 72/1289; H04W 72/126;
(Continued)

(56) References Cited

U.S. PATENT DOCUMENTS

| | | |
|---|---|---|
| 2019/0229871 A1 | 7/2019 | Shi et al. |
| 2020/0127786 A1 | 4/2020 | Kwak et al. |

(Continued)

OTHER PUBLICATIONS

International Searching Authority, "International Search Report and Written Opinion", from PCT Application No. PCT/US2022/077743, from Foreign Counterpart to U.S. Appl. No. 17/938,748, filed Jan. 31, 2023, pp. 1 through 8, Published: KR.
(Continued)

*Primary Examiner* — Wei Zhao
(74) *Attorney, Agent, or Firm* — Fogg & Powers LLC (57) ABSTRACT

Orthogonal DMRS ports with resource block reuse in a single cell is provided. ABS comprises: a BBE and RUs. The BS transmits user data to each of a plurality of UEs on a PDSCH using a PRB allocation for the cell. The PRB and cell are the same for all UEs. The PRB comprises DMRS symbols. The BS transmits user data to each UE on the PDSCH using a respective non-intersecting subset of the RUs. No RU transmits user data on the PDSCH using the PRB to more than one UE. The BBE: determines non-intersecting sets of DMRS ports; assigns one set to each UE; and causes the BS to transmit UE-specific DMRS to UE on the DMRS ports in the set assigned to that UE using only a respective non-intersecting subset of RUs used for transmitting user data to that UE on the PDSCH using the PRB.

29 Claims, 3 Drawing Sheets

(58) Field of Classification Search
CPC . H04L 25/0224; H04L 5/0051; H04L 1/0057; H04L 1/0003
See application file for complete search history.

(56) References Cited

U.S. PATENT DOCUMENTS

| | | |
|---|---|---|
| 2020/0266963 A1 | 8/2020 | Song et al. |
| 2021/0045105 A1* | 2/2021 | Yoon ..................... H04L 1/1864 |
| 2021/0051571 A1* | 2/2021 | Xu ........................ H04W 72/04 |
| 2024/0113808 A1* | 4/2024 | Lee ....................... H04L 1/0057 |

OTHER PUBLICATIONS

Lenovo et al., "PDSCH/PUSCH scheduling enhancements for NR from 52.6 GHz to 71 Ghz", R1-2109901, #GOO TSG RAN WG1 #106bis-e, e-meeting, Oct. 11-19, 2021, pp. 1 through 8.

Zte et al., "Discussion on the PDSCH/PUSCH enhancements for 52.6 to 71GHz", R1-2107004, 3GPP TSG RAN WG1 #106-e, e-Meeting, Aug. 16-27, 2021, pp. 1 through 22.

* cited by examiner

SYSTEMS AND METHODS FOR USING ORTHOGONAL DEMODULATION REFERENCE SIGNAL PORTS WITH RESOURCE BLOCK REUSE IN A SINGLE CELL

CROSS-REFERENCE TO RELATED APPLICATIONS

This application claims priority to U.S. Provisional Patent Application No. 63/262,202, filed Oct. 7, 2021, titled "SYSTEMS AND METHODS FOR USING ORTHOGONAL DEMODULATION REFERENCE SIGNAL (DMRS) PORTS WITH RESOURCE BLOCK REUSE IN A SINGLE CELL", which is incorporated herein by reference in its entirety.

BACKGROUND

The Fifth Generation New Radio (5G NR) standards do not specify that UEs perform channel estimation using CRS that are shared by all UEs. Instead they specify that UEs perform channel estimation using demodulation reference signals (DMRS) that are dedicated to a single UE, though the same DMRS may be used by more than one UE in the specific case of MU-MIMO (Multi-User, Multiple-Input, Multiple-Output). However, such a single-UE DMRS approach is not adequate for base stations that implement frequency reuse since a given resource block may be used to transmit different user data to multiple UEs, all of which need to perform channel estimation.

SUMMARY

A base station is provided for providing wireless service to user equipment (UEs) using a cell comprises: at least one baseband entity; and a plurality of radio units communicatively coupled to the at least one baseband entity, each of the plurality of radio units associated with a respective set of one or more antennas to wirelessly communicate with one or more UEs using the cell; wherein the base station is configured to transmit respective different user data to each of a plurality UEs on a physical downlink shared channel (PDSCH) using a physical resource block (PRB) allocation for the cell, wherein the PRB allocation and the cell are the same for all of the plurality of UEs; wherein the PRB allocation comprises one or more demodulation reference signals (DMRS) symbols; wherein the base station is configured to transmit the respective different user data to each of the plurality UEs on the PDSCH using the PRB allocation for the cell using a respective non-intersecting subset of the radio units, wherein no radio unit is used to transmit respective user data on the PDSCH using the PRB allocation for the cell to more than one of the plurality of UEs; and wherein the at least one baseband entity is configured to: determine a plurality of non-intersecting sets of DMRS ports; assign one of the plurality of non-intersecting sets of DMRS ports to each of the plurality of UEs; and cause the base station to transmit, during the one or more DMRS symbols of the PRB allocation, respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

A method of transmitting demodulation reference signals (DMRS) to a plurality of UEs in connection with a base station transmitting respective different user data to each of the plurality UEs on a physical downlink shared channel (PDSCH) using a physical resource block (PRB) allocation for a cell is provided. The PRB allocation and the cell are the same for all of the plurality of UEs, the PRB allocation comprising one or more DMRS symbols. The method includes determining a plurality of non-intersecting sets of DMRS ports. The method also includes assigning at least one of the plurality of non-intersecting sets of DMRS ports to each of the plurality of UEs. The method also includes causing the base station to transmit, during the one or more DMRS symbols of the PRB allocation, respective UE-specific DMRS to each of the plurality of UEs on the DMRS ports included in the respective non-intersecting set of DMRS ports assigned to that UE. The respective different user data is transmitted to each of the plurality UEs on the PDSCH using the PRB allocation for the cell using a respective non-intersecting subset of radio units, wherein no radio unit is used to transmit respective user data on the PDSCH using the PRB allocation for the cell to more than one of the plurality of UEs. The base station is caused to transmit the respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

BRIEF DESCRIPTION OF THE DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

A centralized or cloud radio access network (C-RAN) is one type of cellular radio access network (RAN). Typically, a centralized set of baseband entities interacts with multiple radio units ("RUs", also referred to as "radio points" or "RPs") in order to provide wireless service to various items of user equipment (UEs). Each base station (BS) implemented by the C-RAN may comprise a single baseband entity (BBE, sometimes referred to as a "baseband controller" or a "baseband unit" or "BBU") that performs Layer-3, Layer-2, and some Layer-1 processing for the base station. Each base station may also comprise multiple baseband entities, for example, one or more central unit (CU) entities that implement Layer 3 and non-time critical Layer 2 functions for the base station, and one or more distribution units (DU) that implement the time-critical Layer-2 functions for the base station and some Layer-1 functions for the base station. In general, the remote units implement the Layer-1 functions not implemented by the baseband entities as well as the radio frequency (RF) functions. The multiple remote units are typically located remotely from each other (that is, the multiple remote units are not co-located). The baseband entities are communicatively coupled to the remote units over a fronthaul network.

In some RAN implementations, each base station is configured to wirelessly communicate with each UE served by the base station using a respective subset of the RUs used with that base station. This respective subset of RUs for each UE is also referred to here as the "signal zone" (SZ) for that UE. In such implementations, downlink data is wirelessly transmitted to a given UE by wirelessly transmitting that downlink data from the RUs included in that UE's signal zone, and uplink data is wirelessly received from a given UE by combining data received at the RUs included in that UE's signal zone. The SZ used for transmitting data to a UE may be different from the SZ used for receiving data from the UE.

This type of base station can also be configured to support frequency reuse. "Frequency reuse" in the downlink refers to situations where separate downlink data intended for different UEs is simultaneously wirelessly transmitted to the UEs using the same physical resource blocks (PRBs) for the same cell but using different RUs. Frequency reuse in the uplink refers to situations where separate uplink data simultaneously wirelessly transmitted from different UEs using the same PRBs for the same cell is received using different RUs. In such situations, the reuse UEs are also referred to here as being "in reuse" with each other. For those PRBs where frequency reuse is used, each of the multiple reuse UEs is served by a different subset of the RUs, where no RU is used to serve more than one UE for those reused PRBs.

In general, reference symbols are used for many purposes in a RAN system. For early releases of the Fourth Generation Long Term Evolution (4G LTE) standards, each UE used cell-specific reference signals (CRS) to obtain channel estimates to support demodulation of user data transmitted to that UE on the Physical Downlink Shared Channel (PDSCH). A "channel estimate" refers to an estimate of the time-varying channel frequency response based on a known set of resource elements (RE). The same CRS are used by all UEs to determine their respective channel estimates. Since CRS are used for purposes other than channel estimation, CRS are typically broadcast from all of the RUs used to implement bases stations of the type described above. However, with such base stations, the channel used for the CRS (which are broadcast from all RUs) may deviate from the composite channel used for transmitting user data on the PDSCH to a UE if less than all of the RUs are used for transmitting the user data to that UE. This deviation causes the channel estimates a UE determines to be biased in comparison to the composite channel used for transmitting user data on the PDSCH. This bias can cause the UE to obtain an incorrect estimate of the channel signal to interference and noise ratio (SINR). Such an incorrect estimate can contribute to increased error in the downlink (DL) data transmission because the base station uses feedback from the UE in determining the data rate.

The Fifth Generation New Radio (5G NR) standards do not specify that UEs perform channel estimation using CRS that are shared by all UEs. Instead they specify that UEs perform channel estimation using demodulation reference signals (DMRS) that are dedicated to a single UE, though the same DMRS may be used by more than one UE in the specific case of MU-MIMO (Multi-User, Multiple-Input, Multiple-Output). However, such a single-UE DMRS approach is not adequate for base stations that implement frequency reuses since a given resource block may be used to transmit different user data to multiple UEs, all of which need to perform channel estimation.

Figure 1:
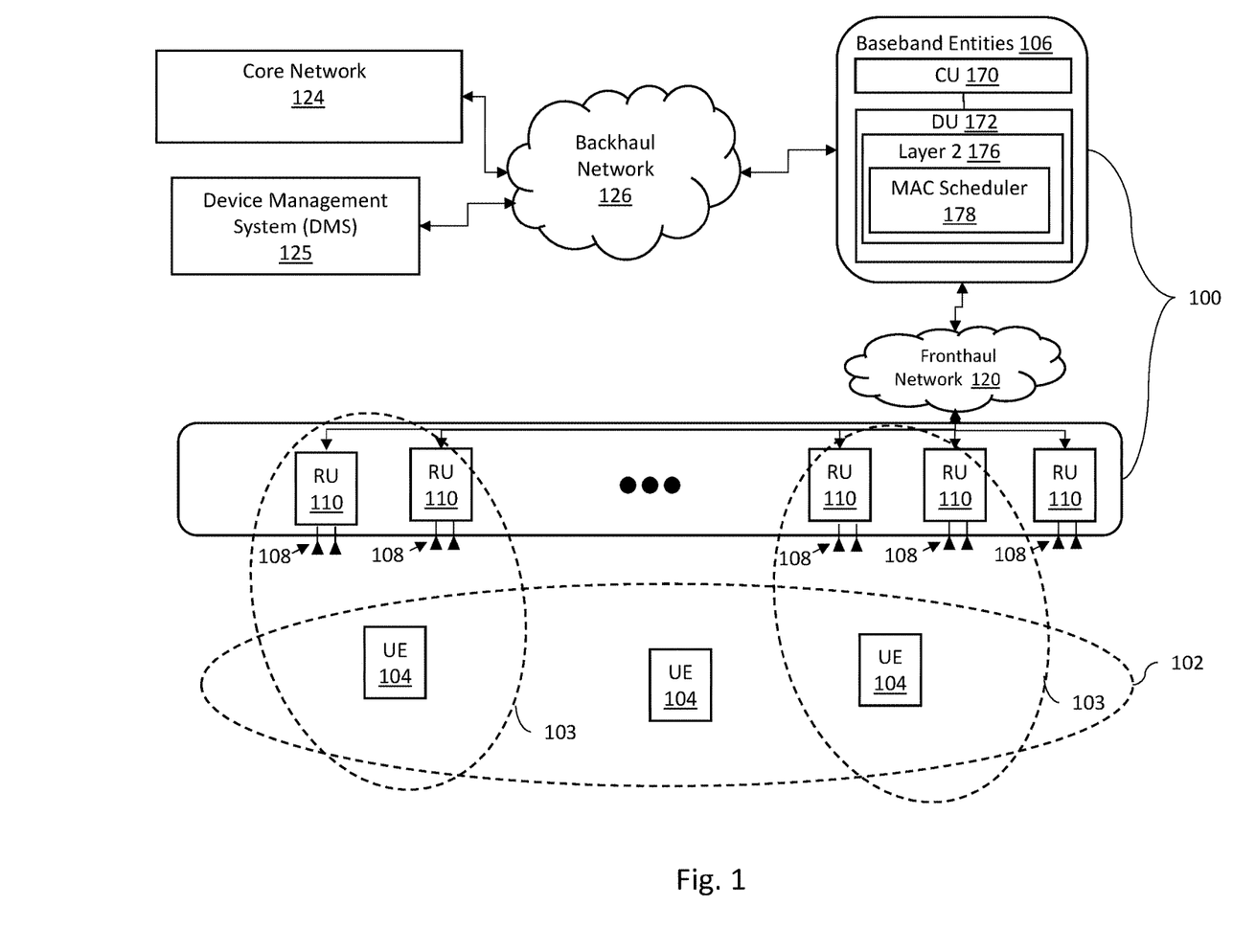
FIG. 1 is a diagram of an example radio access network embodiment.

FIG. 1 is a block diagram illustrating one exemplary embodiment of a base station 100 in which the techniques described below can be used. The base station 100 shown in FIG. 1 serves a cell 102. In the context of a Fourth Generation (4G) Long Term Evolution (LTE) implementation, the base station 100 may also be referred to as an "evolved NodeB" or "eNodeB." In the context of a Fifth Generation (5G) New Radio (NR) implementation, the base station 100 may also be referred to as a "gNodeB." In general, the base station 100 is configured to provide wireless service to various items of user equipment (UEs) 104 served by the cell 102. Unless explicitly stated to the contrary, references to Layer 1, Layer 2, Layer 3, and other or equivalent layers (such as the Physical Layer or the Media Access Control (MAC) Layer) refer to the particular wireless interface (for example, 4G LTE or 5G NR) used for wirelessly communicating with UEs 104 served by the cell 102.

In the exemplary embodiment shown in FIG. 1, for each cell 102, the associated base station 100 is partitioned into a set of one or more baseband entities 106 that interact with multiple radio units (RU) 110 in order to provide wireless service to various items of the UEs 104. More specifically, in the exemplary embodiment shown in FIG. 1, the base station 100 is partitioned into multiple baseband entities 106 including a central unit (CU) 170 and one or more distributed units (DUs) 172, and one or more radio units (RUs) 110.

The CU 170 implements Layer 3 and non-time critical Layer 2 functions for the base station 100. Specifically, in some configurations, the CU 170 comprises a logical node hosting Packet Data Convergence Protocol (PDCP), Radio Resource Control (RRC), Service Data Adaptation Protocol (SDAP), and other control functions. Therefore, in some configurations, each CU 170 implements the gNB controller functions such as the transfer of user data, mobility control, radio access network sharing, positioning, session management, etc. The CU 170 controls the operation of the DUs 172 over an interface (including F1-c and F1-u for the control plane and user plane, respectively). The CU 170 can optionally be further partitioned into a central unit control-plane (CU-CP) entity that handles control plane functions and one or more central unit user-plane (CU-UPs) entities that handles user plane functions.

Each DU 172 is configured to implement the time critical Layer 2 functions and at least some of the Layer 1 (also referred to as the Physical Layer) functions for the base station 100. In this example, each RU 110 is configured to implement the radio frequency (RF) interface 184 and the Layer 1 functions 186 for the base station 100 that are not implemented in the DU 172. In some configurations, each DU 172 comprises a logical node hosting (performing processing for) Radio Link Control (RLC) and Media Access Control (MAC) layers, as well as optionally the upper or higher portion of the Physical (PHY) layer (where the PHY layer is split between the DU 172 and RU 110). In other words, the DUs 172 implement a subset of the gNB functions, depending on the functional split (between CU 170 and DU 172).

Different splits in the wireless-interface functions between the CU 170, DU(s) 172, and the RUs 106 can be used. For example, the functional split used for downlink communications (that is, communications transmitted to the UEs 104) can differ from the functional split used for uplink communications (that is, communications received from the UEs 104). Also, for a given direction (downlink or uplink), the same functional split does not need to be used for all front-haul data communicated in that direction. For example, different functional splits can be used for different channels or different resource blocks.

Each RU 110 includes or is coupled to one or more antennas 108 via which downlink RF signals are radiated to various items of UE 104 and via which uplink RF signals transmitted by UEs 104 are received.

In one implementation, each RU 110 is remotely located from the set of baseband entities 106 serving it. Also, in such an implementation, at least one of the RUs 110 is remotely located from at least one other RU 110 serving that cell 102. In another implementation, at least some of the RUs 110 are co-located with each other, where the respective sets of antennas 108 associated with the RUs 110 are directed to transmit and receive signals from different areas.

In some configurations, at least some of the RUs 110 are implemented as multi-carrier radio units 110. The gNodeB 100 can be implemented using only single-carrier radio units 110, only multi-carrier radio units 110, or both single-carrier radio units 110 and multi-carrier radio units 110. Also, any given cell 102 can be served by only single-carrier radio units 110, only multi-carrier radio units 110, or both single-carrier radio units 110 and multi-carrier radio units 110.

When an RU 110 optionally serves multiple cells 102 using multiple carriers, it may do so by implementing different RU instances (e.g., modules). For example, an RU 110 could use a different RU instance for each carrier the RU 110 implements. In some examples, each RU instance within an RU 110 may be implemented as an independent digital instance (e.g., a processing core) on one or more programmable processors in a multi-instance RU 110 within a single physical housing, e.g., where each programmable processor is a field programmable gate array (FPGA), an application specific integrated circuit (ASIC), a microprocessor, or a digital signal processor (DSP). Each multi-instance RU 110, may optionally have multiple ETHERNET ports, each being assigned to a different RU instance (though all RU instances in a multi-instance RU may optionally share the same IP address).

Each multi-carrier radio unit 110 may optionally include multiple RF modules and be configured to serve multiple cells 102 using multiple carriers, possibly using multiple wireless interfaces or protocols, in a flexible and dynamic manner. Typically, each multi-carrier radio unit 110 is homed to a separate BC 120 for each cell 102 that it serves (and each carrier used to serve that cell 102).

The RUs 110 are communicatively coupled to the set of baseband entities 106 serving the cell 102 via a fronthaul network 120 (for example, using a switched Ethernet network and the Internet Protocol (IP)). The set of baseband entities 106 is coupled to a core network 124 of the associated wireless service network operator over an appropriate backhaul network 126 (such as the Internet). The set of baseband entities 106 may further be coupled to a device management system (DMS) 125 for configuring one or more aspects of the base station 100. The physical nodes used to implement the set of baseband entities 106 includes suitable network interfaces to couple those nodes (and the set of baseband entities 106) to the fronthaul network 120 in order to facilitate communications between the set of baseband entities 106 and the RUs 110. Likewise, the physical nodes used to implement the set of baseband entities 106 includes suitable network interfaces to couple the nodes (and set of baseband entities 106) to the backhaul 126 in order to facilitate communications between the set of baseband entities 106 and the core network 124.

Figure 1A:
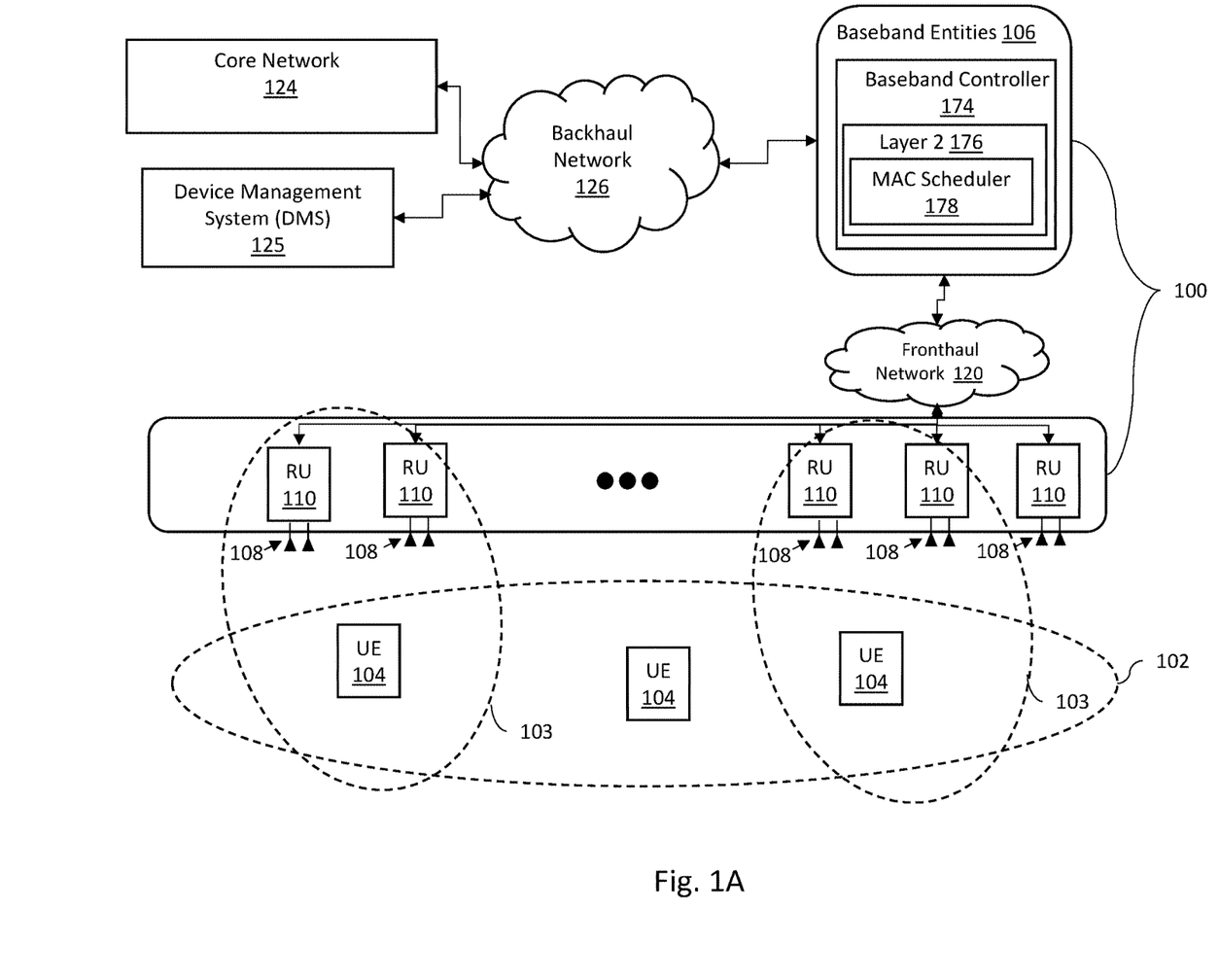
FIG. 1A is a diagram of an alternate radio access network embodiment.

FIG. 1A illustrates an alternative embodiment of the base station 100 in which the set of baseband entities 106 comprises a single baseband entity (also referred to here as a "baseband controller" or simply a "baseband unit" or BBU) 174 that is configured to implement all of the functions described above in connection FIG. 1 as being implemented by the CU 170 and DUs 172. Otherwise, the embodiment shown in FIG. 1A is the same as the embodiment shown in FIG. 1.

For each baseband entity 106 and RU 110, any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each baseband entity 106 and RU 110 can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment) and in different locations within an operator's network (for example, in the operator's "edge cloud" or "central cloud").

For example, in some configurations, each RU 110 is implemented as a physical network function (PNF) and is deployed in a physical location where radio coverage is to be provided; each DU 172 is implemented as a virtual network function (VNF) and, as the name implies, is typically distributed and deployed in a distributed manner in the operator's edge cloud; and each CU-CP and CU-UP are implemented as virtual network functions (VNFs) and, as the name implies, are typically centralized and deployed in the operator's central cloud. Additionally, the CU-CP VNF and CU-UP VNF is optionally be centralized and deployed in an edge cloud and/or PNF. In other embodiments, one or both may be deployed in a central cloud. In some configurations, the CU 170 (e.g., including a CU-CP VNF and CU-UP VNF) and the entities used to implement it are communicatively coupled to each DU VNF served by the CU 170 (and the DU VNF(s) used to implement each such DU 172). In the example shown in FIG. 1, the DU VNF(s) used to implement a DU 172 are communicatively coupled to each RU 110 served by the DU VNF using a fronthaul network 120 (for example, a switched Ethernet network that supports the IP).

Each baseband entity 106 and RU 110, and any of the specific features described here as being implemented thereby, can be implemented in other ways.

The base station 100 is configured to wirelessly communicate with each UE 104 served by the base station 100 using a respective subset of the RUs 110 serving that cell 102. This respective subset of RUs 110 for each UE 104 is also referred to herein as the "signal zone" (SZ) 103 for that UE 104 (or alternately the "simulcast zone" for that UE 104). That is, downlink data is wirelessly transmitted to a given UE 104 by wirelessly transmitting that downlink data from the RUs 110 included in that UE's signal zone 103, and uplink data is wirelessly received from a given UE 104 by combining data received at the RUs 110 included in that UE's signal zone 103. The SZ 103 used for transmitting downlink data to a UE 104 may be different from the SZ 103 used for receiving uplink data from the UE 104. However, in the following description, for ease of explanation, it is assumed that the SZ 103 used for transmitting data to a UE 104 is the same as the SZ 103 used for receiving data from that UE 104.

The signal zone can vary from UE-to-UE and a given UE's signal zone can change as the UE 104 moves throughout the coverage area associated with the cell 102. The corresponding downlink fronthaul data for each UE 104 is communicated from the set of baseband entities 106 over the fronthaul network 120 to each RU 110 in that UE's signal zone 103.

In general, the signal zone for a UE 104 includes those RUs 110 that have the "best" or "strongest" signal reception characteristics for that UE 104, assuming those RUs 110 have sufficient capacity. As such, each signal zone 103 is associated with a specific UE 104 and is dynamically defined on a UE by UE basis.

In one exemplary embodiment, the SZ 103 for each UE 104 can be determined by the serving DU 172 or baseband controller 174 using a "signature vector" (SV) associated with that UE 104. Each element of the signature vector corresponds to one of the RUs 110 used to serve the cell 102 and comprises one or more numerical values associated with the signal transmission or reception characteristics for that UE 104.

The elements of the signature vector for each UE 104 can be determined based on uplink transmissions from the UE 104. Such an approach is based on the assumption that the relative signal reception metrics determined using such uplink transmissions are representative of signal reception characteristics for downlink transmissions made from those RU 110 and are sufficiently representative for the purpose of determining the SZ 103 for the UE 104.

For example, the signature vector can be determined based on received power measurements made at each of the RUs 110 serving the cell 102 for one or more uplink transmissions from the UE 104 (for example, Physical Random Access Channel (PRACH), Physical Uplink Control Channel (PUCCH), Physical Uplink Shared Channel (PUSCH), and Sounding Reference Signals (SRS) transmissions). More specifically, each RU 110 serving the cell 102 will receive those uplink transmissions and can measure or otherwise determine a signal reception metric indicative of the power level of the transmissions received by that RU 110 from the UE 104. One example of such a signal reception metric is a signal-to-noise plus interference ratio (SNIR). The signature vector can be updated over the course of a UE's connection to the cell 102 (for example, based on SRS transmissions from the UE 104).

One way that the respective signature vector determined for a given UE 104 can be used to determine the respective SZ 103 for that UE 104 is by using the signature vector to calculate a "total SZ power" and a "total available power" for that UE 104. The total SZ power for a given UE 104 is the sum of the respective signal reception metrics determined for that UE 104 corresponding to the RUs 110 that are currently included in the SZ 103 of that UE 104. The "total available power" for the UE 104 is the sum of the signal reception metrics determined for that UE 104 that correspond to all of the RUs 110. The SZ 103 for a UE 104 can be determined by including enough RUs 110 in the SZ 103 for the UE 104 so that the total SZ power for the UE 104 is within a threshold amount of the total available power for the UE 104. More specially, a respective SZ 103 for a UE 104 can be determined by starting with an empty SZ 103 for that UE 104, sorting the RUs 110 based on the respective corresponding signal reception metrics determined for that UE 104 in descending order from strongest power to weakest power, and adding, to the SZ 103 for that UE 104, successive RUs 110 (according to the resulting sorted descending order) until the total SZ power calculated for that UE 104 is within a threshold amount of the respective total available power calculated for that UE 104 or until the number of RUs 110 included in the respective SZ 103 for that UE 104 is equal to a predetermined maximum value.

The base station 100 is configured to support frequency reuse. As noted above, "frequency reuse" in the downlink refers to situations where separate downlink user data intended for different UEs 104 is simultaneously wirelessly transmitted to the UEs 104 using the same physical resource blocks (PRBs) for the same cell 102 but using different RUs 110. Frequency reuse in the uplink refers to situations where separate uplink data simultaneously wirelessly transmitted from different UEs 104 using the same PRBs for the same cell 102 is received using different RUs 110. Such reuse UEs 104 are also referred to here as being "in reuse" with each other. For those PRBs where frequency reuse is used, each of the multiple reuse UEs 104 is served by a different subset of the RUs 110, where no RU 110 is used to serve more than one UE 104 for those reused PRBs. That is, for the reused PRBs, the SZ 103 for each of the multiple reuse UEs 104 does not include any RU 110 that is included in the SZ 103 of any of the other reuse UEs 104. Typically, these situations arise where the reuse UEs 104 are sufficiently physically separated from each other so that the co-channel interference resulting from the different wireless downlink transmissions is sufficiently low (that is, where there is sufficient RF isolation). The number N of UEs 104 that are in reuse with each other is also referred to here as the "reuse factor" N.

In general, the determination of the signal zone for each UE 104 and the scheduling of UEs 104 in a way that results in downlink and uplink frequency reuse is implemented as a part of the Layer 2 functions 176 implemented by one or more of the set of baseband entities 106. For example, as shown in Figure, this can be implemented as a part of a MAC scheduler 178 implemented in the DU 172 shown in FIG. 1 or in the baseband controller 174 shown in FIG. 1A.

As noted above, the 5G NR standards do not specify that UEs perform channel estimation using CRS that are shared by all UEs and instead specify that UEs perform channel estimation using demodulation reference signals (DMRS) that are dedicated to a single UE. The 5G NR standards specify that multiple orthogonal DMRS may be transmitted during the same one or more DMRS symbols for a given PRB allocation to a single UE. This enables a different DMRS to be transmitted for each spatial multiplexing (SM) layer used to transmit user data to the UE on the PDSCH during the associated PRB allocation, e.g., the orthogonality enables the spatial multiplexing onto a the PDSCH with other signals. The rank indicator for the UE specifies the number of SM layers used for that UE. Each orthogonally multiplexed DMRS transmitted during the same one or more DMRS symbols for a given PRB allocation is also referred to as being transmitted on a respective "DMRS port." The maximum number of DMRS ports on which orthogonally multiplexed DMRS can be transmitted during the same one or more DMRS symbols for a given PRB allocation depends on the particular DMRS configuration type used by the base station. For example, a maximum of 12 DMRS ports can be used in one DMRS configuration type.

In some configurations, the DMRS is a known frequency-reuse-layer-specific Zadoff-Chu symbol sequence. In other words, each DMRS can optionally be specific to a frequency-reuse layer and a specific Zadoff-Chu symbol sequence assigned/configured, by the L1 processing implementation in the DU 172, at the UE 104.

The 5G NR standards specify that multiple orthogonal DMRS may be transmitted during the same one or more DMRS symbols using different DMRS ports, and the 5G NR standards contemplate that all of the multiple orthogonal DMRS transmitted during the same one or more DMRS symbols for a given PRB allocation will be transmitted to the same UE using the same set of radio units. The 5G NR standard also contemplates MU-MIMO for which multiple UEs share the same PRB allocation in the same RUs. The embodiments described herein apply for reuse architectures in which multiple UEs share the same PRBs, but the set of RUs used for transmission to one UE do not intersect with the RUs used for transmission to any of the other UEs.

The base station 100 is configured so that multiple UEs 104 that are in downlink reuse together for a given PDSCH PRB allocation can use the same one or more DMRS symbols associated with the PDSCH PRB allocation for channel estimation. This can be done if the total number of SM layers used to transmit user data on the PDSCH to all of the multiple UEs 104 in reuse together is equal to or less than the maximum number of DMRS ports permitted by the current DMRS configuration type of the base station 100. Although in most situations a given DMRS port would be assigned only to one UE, it should be understood that in some embodiments to further increase the reuse factor, a given DMRS port may be used by two or more UEs if it is ascertained that their (non-intersecting) sets of RUs have sufficient signal/interference isolation.

Figure 2:
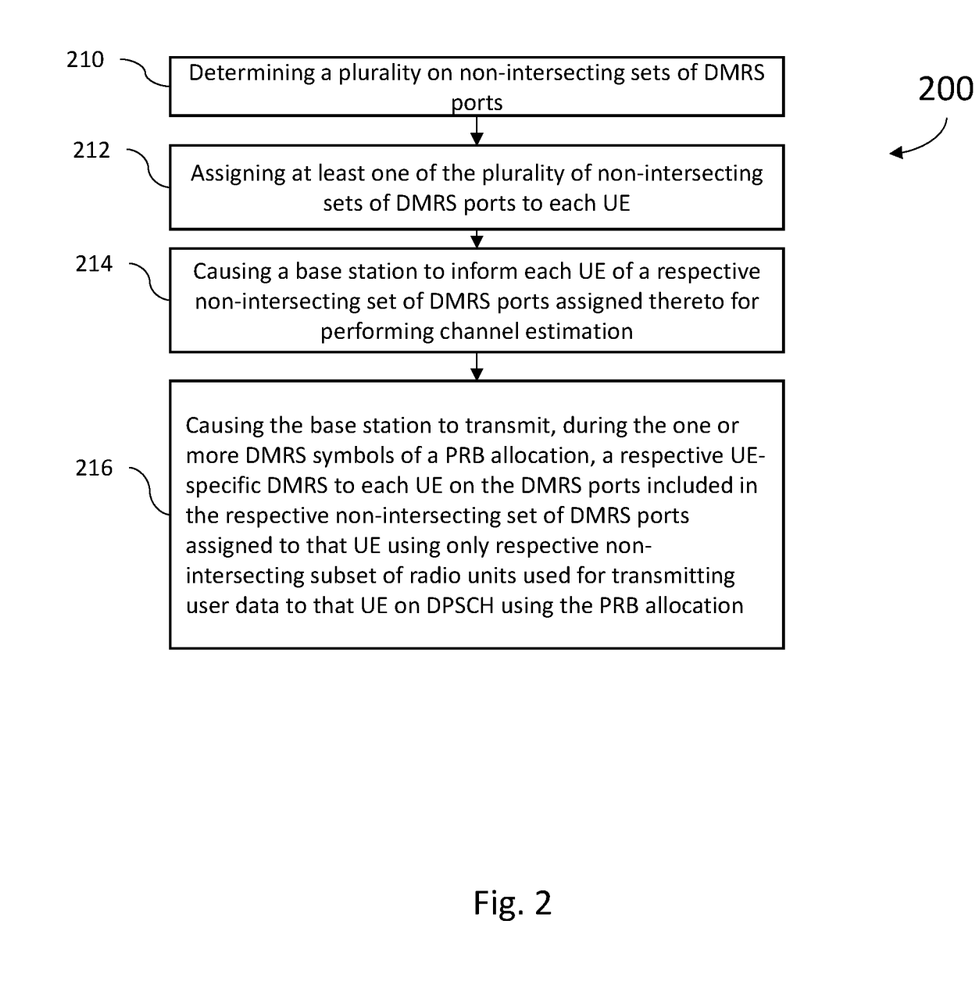
FIG. 2 is a flow chart illustrating a method embodiment.

FIG. 2 is a flow chart illustrating an example embodiment of a method 200 of transmitting DMRS to a plurality of UEs 104. Method 200 is described here as being used in situations where wherein the base station 100 is configured to transmit respective different user data to each of a plurality UEs 104 on a physical downlink shared channel (PDSCH) using a physical resource block (PRB) allocation for the cell 102 and where the PRB allocation and the cell 102 are the same for all of the plurality of UEs 104. That is, method 200 is used in situations where downlink frequency reuse of the type described above is being used. It should be understood that method 200 may be implemented using any one of the embodiments described above. As such, elements of method 200 may be used in conjunction with, in combination with, or substituted for elements of any of the embodiments described herein. Further, the functions, structures, features and other description of elements for such embodiments described herein may apply to like named elements of method 200 and vice versa.

The method 200 begins at 210 with determining a plurality of non-intersecting sets of DMRS ports and then proceeds to 212 with assigning at least one of the plurality of non-intersecting sets of DMRS ports to each of the plurality of UEs 104. Each of the sets of DMRS ports are "non-intersecting" in the sense that each DMRS port is included in at most one of the sets of DMRS ports.

In general, if a reuse factor of N is used with a given PDSCH PRB allocation (meaning N UEs 104 will be in reuse together), the plurality of non-intersecting sets of DMRS ports determined for the N UEs 104 will include N sets, where each of the N UEs 104 is assigned one of the non-intersecting sets of DMRS ports. The number of DMRS ports included in the non-intersecting set of DMRS ports assigned to each of the N UEs 104 in reuse is equal to the rank indicator for that UE 104. The rank indicator for each UE 104 indicates the number of SM layers that will be used to transmit user data on the PDSCH to that UE 104. As noted above, the total number of SM layers used to transmit user data on the PDSCH to all of the multiple UEs 104 in reuse together should be equal to or less than the maximum number of DMRS ports permitted by the current DMRS configuration type used by the base station 100.

For example, if the base station 100 is configured to use a DMRS configuration type that supports a maximum of 12 DMRS ports, 6 UEs 104 all having a rank indicator of 2 can be put into reuse together and assigned one of 6 non-intersecting sets of DMRS ports, each including 2 different DMRS ports. A rank indicator of 2 means 2 SM layers will be used to transmit user data to each of the UEs 104. Dividing the maximum number of DMRS ports supported (that is, 12) by the number of SM layers used per UE 104 (that is, 2), results in a reuse factor N of 6 for this example. In another example where the base station 100 is again configured to use a DMRS configuration type that supports a maximum of 12 DMRS ports, 3 UEs 104 all having a rank indicator of 4 can be put into reuse together and assigned one of 3 non-intersecting sets of DMRS ports, each including 4 different DMRS ports. A rank indicator of 4 means 4 SM layers will be used to transmit user data to each of the UEs 104. Dividing the maximum number of DMRS ports supported (that is, 12) by the number of SM layers used per UE 104 (that is, 4), results in a reuse factor N of 3 for this example. In other examples, not all of the UEs 104 in reuse together have the same rank indicator.

The method proceeds to 214 with causing the base station 100 to inform each of the plurality of UEs 104 of the respective set of DMRS ports assigned thereto for performing channel estimation. This can be done by causing the base station 100 to send appropriate downlink control information (DCI) messages on the Physical Downlink Control Channel (PDCCH) to the UEs 104.

The method proceeds to 216 with causing the base station 100 to transmit, during the one or more DMRS symbols of the PRB allocation, respective UE-specific DMRS to each of the plurality of UEs 104 on the DMRS ports included in the respective non-intersecting set of DMRS ports assigned to that UE 104 using only the respective non-intersecting subset of the radio units 110 used for transmitting the respective different user data to that UE 104 on the PDSCH using the PRB allocation. For each SM layer used for communicating user data to each of the UEs 104 in reuse, the base station 100 generates respective UE-specific DMRS and transmits them on one of DMRS ports included in the non-intersecting set assigned to that UE 104 during the one or more DMRS symbols for the PDSCH PRB allocation. The DMRS for each UE 104 are transmitted using only the one or more RUs 110 included in the signal zone for that UE 104.

Each of the UEs 104 will use the DMRS received on the DMRS ports assigned to that UE 104 and use them for channel estimation for the associated PDSCH PRB allocation. Because the DMRS for each of the UEs 104 in reuse together are transmitted only from the one or more RUs 110 also used for transmitting user data to that UE 104 on the PDSCH using the PRB allocation (that is, are transmitted only from the RUs 110 in that UE's 104 signal zone), the resulting channel estimation determined from the DMRS should reflect the channel conditions used for transmitting the user data using the associated PDSCH PRB allocation. That is, the channel estimation should be free of the bias that would otherwise result if the reference signals used for channel estimation were transmitted from a group of RUs 110 that differed from the group of RUs 110 used for transmitting user data during the associated PDSCH PRB allocation. Moreover, this approach to DMRS transmission supports frequency reuse without requiring additional resource elements to be used for transmitting DMRS to the multiple UEs in reuse together.

As noted above, the base station 100 can be configured to implement the processing associated with method 200. More specifically, the processing associated with method 200 can be implemented primarily as a part of the Layer 2 functions 176 with support from the other functions implemented by the base station 100 (for example, this processing can be implemented primarily in the MAC scheduler 178 implemented in the DU 172 or baseband controller 174 with support from the other functions implemented by the base station 100).

EXAMPLES

Example 1 includes a base station for providing wireless service to user equipment (UEs) using a cell, the base station comprising: at least one baseband entity; and a plurality of radio units communicatively coupled to the at least one baseband entity, each of the plurality of radio units associated with a respective set of one or more antennas to wirelessly communicate with one or more UEs using the cell; wherein the base station is configured to transmit respective different user data to each of a plurality of UEs on a physical downlink shared channel (PDSCH) using a physical resource block (PRB) allocation for the cell, wherein the PRB allocation and the cell are the same for all of the plurality of UEs; wherein the PRB allocation comprises one or more demodulation reference signals (DMRS) symbols; wherein the base station is configured to transmit the respective different user data to each of the plurality UEs on the PDSCH using the PRB allocation for the cell using a respective non-intersecting subset of the radio units, wherein no radio unit is used to transmit respective user data on the PDSCH using the PRB allocation for the cell to more than one of the plurality of UEs; and wherein the at least one baseband entity is configured to: determine a plurality of non-intersecting sets of DMRS ports; assign one of the plurality of non-intersecting sets of DMRS ports to each of the plurality of UEs; and cause the base station to transmit, during the one or more DMRS symbols of the PRB allocation, respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

Example 2 includes the base station of Example 1, wherein the at least one baseband entity is further configured to cause the base station to inform each of the plurality of UEs of the respective non-intersecting set of DMRS ports assigned thereto for performing channel estimation.

Example 3 includes the base station of any of Examples 1-2, the at least one baseband entity comprising a Media Access Control (MAC) scheduler configured to determine the plurality of non-intersecting sets of DMRS ports as a function of spatial multiplexing (SM) layers used to transmit user data to the UE.

Example 4 includes the base station of any of Examples 1-3, wherein DMRS ports for each UE are transmitted using only radio units included in a signal zone for that UE.

Example 5 includes the base station of any of Examples 1-4, wherein the at least one baseband entity comprises a baseband controller, wherein the plurality of non-intersecting sets of DMRS ports is determined by the baseband controller.

Example 6 includes the base station of any of Examples 1-5, wherein the at least one baseband entity comprises a central unit (CU) coupled to at least one distributed unit (DU), wherein the plurality of non-intersecting sets of DMRS ports is determined by the DU.

Example 7 includes the base station of any of Examples 1-6, where the one or more DMRS symbols comprise reference data utilized by the UEs to facilitate channel estimation.

Example 8 includes the base station of Example 7, wherein the reference data is orthogonally multiplexed across the plurality of non-intersecting sets of DMRS ports.

Example 9 includes the base station of any of Examples 1-8, wherein the base station implements a frequency reuse scheme.

Example 10 includes the base station of any of Examples 1-9, wherein the PDSCH is transmitted to each of the plurality of UEs from different non-intersecting sets of radio units configured to transmit a respective one of the plurality of non-intersecting sets of DMRS ports to each of the plurality of UEs.

Example 11 includes the base station of Example 10, wherein the PDSCH comprises a physical downlink channel that carries user data.

Example 12 includes the base station of any of Examples 10-11, wherein each of the one or more UE compute a channel estimate for the PDSCH based on a respective assigned one of the plurality of non-intersecting sets of DMRS ports.

Example 13 includes the base station of any of Examples 1-12, wherein the base station comprises either a fourth generation (4G) Long Term Evolution (LTE) system eNodeB or a fifth generation (5G) New Radio (NR) system gNodeB.

Example 14 includes the base station of any of Examples 1-13, wherein the base station utilizes a wireless interface for wirelessly communicating with a cell providing a coverage area for the UE.

Example 15 includes the base station of any of Examples 1-14, wherein the baseband entity is coupled to the plurality of radio units by a fronthaul network.

Example 16 includes the base station of any of Examples 1-15, wherein the baseband entity is coupled to a wireless service network operator core network by a backhaul network.

Example 17 includes a radio access network comprising the base station of any one of Examples 1-Example 16.

Example 18 includes a method of transmitting demodulation reference signals (DMRS) to a plurality of UEs in connection with a base station transmitting respective different user data to each of the plurality UEs on a physical downlink shared channel (PDSCH) using a physical resource block (PRB) allocation for a cell, wherein the PRB allocation and the cell are the same for all of the plurality of UEs, the PRB allocation comprising one or more DMRS symbols, the method comprising: determining a plurality of non-intersecting sets of DMRS ports; assigning at least one of the plurality of non-intersecting sets of DMRS ports to each of the plurality of UEs; and causing the base station to transmit, during the one or more DMRS symbols of the PRB allocation, respective UE-specific DMRS to each of the plurality of UEs on the DMRS ports included in the respective non-intersecting set of DMRS ports assigned to that UE; wherein the respective different user data is transmitted to each of the plurality UEs on the PDSCH using the PRB allocation for the cell using a respective non-intersecting subset of radio units, wherein no radio unit is used to transmit respective user data on the PDSCH using the PRB allocation for the cell to more than one of the plurality of UEs; and wherein the base station is caused to transmit the respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

Example 19 includes the method of Example 18, further comprising causing the base station to inform each of the plurality of UEs of the respective non-intersecting set of DMRS ports assigned thereto for performing channel estimation.

Example 20 includes the method of any of Examples 18-19, wherein the plurality of non-intersecting sets of DMRS ports are determined as a function of spatial multiplexing (SM) layers used to transmit user data to the UE.

Example 21 includes the method of any of Examples 18-20, wherein DMRS ports for each UE are transmitted using only radio units included in a signal zone for that UE.

Example 22 includes the method of any of Examples 18-21, wherein the base station includes at least one baseband entity that comprises a central unit (CU) coupled to at least one distributed unit (DU), wherein the plurality of non-intersecting sets of DMRS ports is determined by the DU.

Example 23 includes the method of any of Examples 18-22, wherein the base station includes at least one baseband entity that comprises a baseband controller, wherein the plurality of non-intersecting sets of DMRS ports is determined by the baseband controller.

Example 24 includes the method of any of Examples 18-23, where the one or more DMRS symbols are comprises reference data utilized by the UEs to facilitate channel estimation.

Example 25 includes the method of Example 24, wherein the reference data is orthogonally multiplexed across the plurality of non-intersecting sets of DMRS ports.

Example 26 includes the method of any of Examples 18-25, further comprising: transmitting the PDSCH to the plurality of UEs from different non-intersecting sets of radio units configured to transmit a respective one of the plurality of non-intersecting sets of DMRS ports to each of the plurality of UEs.

Example 27 includes the method of Example 26, wherein the PDSCH comprises a physical downlink channel that carries user data.

Example 28 includes the method of any of Examples 26-27, further comprising: computing at the one or more UE a channel estimate for the PDSCH based on a respective assigned one of the plurality of non-intersecting sets of DMRS ports.

Example 29 includes the method of any of Examples 18-28, wherein the base station comprises either a fourth generation (4G) Long Term Evolution (LTE) system eNodeB or a fifth generation (5G) New Radio (NR) system gNodeB.

In various alternative embodiments, system and/or device elements, method steps, or example implementations described throughout this disclosure (such as any of the base stations, baseband entities, baseband controller, CUs, DUs, radio units, core network, MAC scheduler, device management system, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, cloud-based virtualized wireless base station related terms such as base stations, baseband controller, baseband unit, radio unit, core network, MAC scheduler, user equipment, device management system, fronthaul network, backhaul network, or sub-parts thereof, refer to non-generic elements as would recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

The invention claimed is:

1. A base station for providing wireless service to user equipment (UEs) using a cell, the base station comprising:
    at least one baseband entity; and
    a plurality of radio units communicatively coupled to the at least one baseband entity, each of the plurality of radio units associated with a respective set of one or more antennas to wirelessly communicate with one or more UEs using the cell;
    wherein the base station is configured to transmit respective different user data to each of a plurality of UEs on a physical downlink shared channel (PDSCH) using a physical resource block (PRB) allocation for the cell, wherein the PRB allocation and the cell are the same for all of the plurality of UEs;
    wherein the PRB allocation comprises one or more demodulation reference signals (DMRS) symbols;
    wherein the base station is configured to transmit the respective different user data to each of the plurality UEs on the PDSCH using the PRB allocation for the cell using a respective non-intersecting subset of the radio units, wherein no radio unit is used to transmit respective user data on the PDSCH using the PRB allocation for the cell to more than one of the plurality of UEs; and
    wherein the at least one baseband entity is configured to:
        determine a plurality of non-intersecting sets of DMRS ports;
        assign one of the plurality of non-intersecting sets of DMRS ports to each of the plurality of UEs; and
        cause the base station to transmit, during the one or more DMRS symbols of the PRB allocation, respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

2. The base station of claim 1, wherein the at least one baseband entity is further configured to cause the base station to inform each of the plurality of UEs of the respective non-intersecting set of DMRS ports assigned thereto for performing channel estimation.

3. The base station of claim 1, the at least one baseband entity comprising a Media Access Control (MAC) scheduler configured to determine the plurality of non-intersecting sets of DMRS ports as a function of spatial multiplexing (SM) layers used to transmit user data to the UE.

4. The base station of claim 1, wherein DMRS ports for each UE are transmitted using only radio units included in a signal zone for that UE.

5. The base station of claim 1, wherein the at least one baseband entity comprises a baseband controller, wherein the plurality of non-intersecting sets of DMRS ports is determined by the baseband controller.

6. The base station of claim 1, wherein the at least one baseband entity comprises a central unit (CU) coupled to at least one distributed unit (DU), wherein the plurality of non-intersecting sets of DMRS ports is determined by the DU.

7. The base station of claim 1, where the one or more DMRS symbols comprise reference data utilized by the UEs to facilitate channel estimation.

8. The base station of claim 7, wherein the reference data is orthogonally multiplexed across the plurality of non-intersecting sets of DMRS ports.

9. The base station of claim 1, wherein the base station implements a frequency reuse scheme.

10. The base station of claim 1, wherein the PDSCH is transmitted to each of the plurality of UEs from different non-intersecting sets of radio units configured to transmit a respective one of the plurality of non-intersecting sets of DMRS ports to each of the plurality of UEs.

11. The base station of claim 10, wherein the PDSCH comprises a physical downlink channel that carries user data.

12. The base station of claim 10, wherein each of the one or more UE compute a channel estimate for the PDSCH based on a respective assigned one of the plurality of non-intersecting sets of DMRS ports.

13. The base station of claim 1, wherein the base station comprises either a fourth generation (4G) Long Term Evolution (LTE) system eNodeB or a fifth generation (5G) New Radio (NR) system gNodeB.

14. The base station of claim 1, wherein the base station utilizes a wireless interface for wirelessly communicating with a cell providing a coverage area for the UE.

15. The base station of claim 1, wherein the at least one baseband entity is coupled to the plurality of radio units by a fronthaul network.

16. The base station of claim 1, wherein the at least one baseband entity is coupled to a wireless service network operator core network by a backhaul network.

17. A radio access network comprising the base station of any one of claims 1-16.

18. A method of transmitting demodulation reference signals (DMRS) to a plurality of UEs in connection with a base station transmitting respective different user data to each of the plurality UEs on a physical downlink shared channel (PDSCH) using a physical resource block (PRB) allocation for a cell, wherein the PRB allocation and the cell are the same for all of the plurality of UEs, the PRB allocation comprising one or more DMRS symbols, the method comprising:
    determining a plurality of non-intersecting sets of DMRS ports;
    assigning at least one of the plurality of non-intersecting sets of DMRS ports to each of the plurality of UEs; and
    causing the base station to transmit, during the one or more DMRS symbols of the PRB allocation, respective UE-specific DMRS to each of the plurality of UEs on the DMRS ports included in the respective non-intersecting set of DMRS ports assigned to that UE;
    wherein the respective different user data is transmitted to each of the plurality UEs on the PDSCH using the PRB allocation for the cell using a respective non-intersecting subset of radio units, wherein no radio unit is used to transmit respective user data on the PDSCH using the PRB allocation for the cell to more than one of the plurality of UEs; and
    wherein the base station is caused to transmit the respective UE-specific DMRS to each of the plurality of UEs on the DMRS ports included in the respective non-intersecting set of DMRS ports assigned to that UE using only the respective non-intersecting subset of the radio units used for transmitting the respective different user data to that UE on the PDSCH using the PRB allocation.

19. The method of claim 18, further comprising causing the base station to inform each of the plurality of UEs of the respective non-intersecting set of DMRS ports assigned thereto for performing channel estimation.

20. The method of claim 18, wherein the plurality of non-intersecting sets of DMRS ports are determined as a function of spatial multiplexing (SM) layers used to transmit user data to the UE.

21. The method of claim 18, wherein DMRS ports for each UE are transmitted using only radio units included in a signal zone for that UE.

22. The method of claim 18, wherein the base station includes at least one baseband entity that comprises a central unit (CU) coupled to at least one distributed unit (DU), wherein the plurality of non-intersecting sets of DMRS ports is determined by the DU.

23. The method of claim 18, wherein the base station includes at least one baseband entity that comprises a baseband controller, wherein the plurality of non-intersecting sets of DMRS ports is determined by the baseband controller.

24. The method of claim 18, where the one or more DMRS symbols are comprises reference data utilized by the UEs to facilitate channel estimation.

25. The method of claim 24, wherein the reference data is orthogonally multiplexed across the plurality of non-intersecting sets of DMRS ports.

26. The method of claim 18, further comprising:
transmitting the PDSCH to the plurality of UEs from different non-intersecting sets of radio units configured to transmit a respective one of the plurality of non-intersecting sets of DMRS ports to each of the plurality of UEs.

27. The method of claim 26, wherein the PDSCH comprises a physical downlink channel that carries user data.

28. The method of claim 26, further comprising:
computing at the one or more UE a channel estimate for the PDSCH based on a respective assigned one of the plurality of non-intersecting sets of DMRS ports.

29. The method of claim 18, wherein the base station comprises either a fourth generation (4G) Long Term Evolution (LTE) system eNodeB or a fifth generation (5G) New Radio (NR) system gNodeB.

* * * * *